United States Patent [19]

Carter et al.

[11] Patent Number: 4,918,288

[45] Date of Patent: Apr. 17, 1990

[54] ELECTRICAL LEAD ARRANGEMENT FOR A HEATABLE TRANSPARENCY

[75] Inventors: Thomas M. Carter, Allison Park; Harold S. Koontz, Pittsburgh, both of Pa.

[73] Assignee: PPG Industries, Inc., Pittsburgh, Pa.

[21] Appl. No.: 267,403

[22] Filed: Nov. 4, 1988

[51] Int. Cl.$^4$ .............................................. H05B 3/26
[52] U.S. Cl. ..................... 219/203; 219/345; 219/522; 219/543; 219/547; 338/308
[58] Field of Search ............. 219/203, 345, 522, 543, 219/547; 338/306-309; 52/171

[56] References Cited

U.S. PATENT DOCUMENTS

| | | | |
|---|---|---|---|
| 2,843,713 | 7/1958 | Morgan | 219/19 |
| 3,379,859 | 5/1966 | Marriott | 219/522 |
| 3,752,348 | 8/1973 | Dickason et al. | 219/203 |
| 3,760,157 | 9/1973 | Newman et al. | 219/522 |
| 3,876,862 | 4/1975 | Newman et al. | 219/522 |
| 4,078,107 | 3/1978 | Bitterice et al. | 219/544 |
| 4,128,448 | 12/1978 | Bitterice et al. | 156/166 |
| 4,213,028 | 7/1980 | Wolf | 219/203 |
| 4,323,946 | 4/1982 | Traux | 361/218 |
| 4,361,751 | 11/1982 | Criss | 219/203 |
| 4,388,522 | 6/1983 | Boaz | 219/203 |
| 4,410,843 | 10/1983 | Sauer | 219/203 |
| 4,543,466 | 9/1985 | Ramus | 219/203 |
| 4,590,535 | 5/1986 | Mang | 361/218 |
| 4,610,771 | 9/1986 | Gillery | 204/192.1 |
| 4,654,067 | 3/1987 | Ramus et al. | 65/60.5 |
| 4,668,270 | 5/1987 | Ramus | 65/106 |
| 4,718,932 | 1/1988 | Pharms | 65/42 |
| 4,721,845 | 1/1988 | Kunert | 219/203 |
| 4,725,710 | 2/1988 | Ramus et al. | 219/203 |
| 4,743,741 | 5/1988 | Ramus | 219/543 |
| 4,744,844 | 5/1988 | Hurst | 156/101 |
| 4,786,784 | 11/1988 | Nikodem et al. | 219/543 |
| 4,820,902 | 4/1989 | Gillery | 219/203 |

Primary Examiner—Bruce A. Reynolds
Assistant Examiner—Leon K. Fuller
Attorney, Agent, or Firm—Andrew C. Siminerio

[57] ABSTRACT

A heated transparency is provided with first and second bus bars along opposing edges of a transparency interconnected by an electroconductive coating. The bus bars and coating are applied to the same surface of the transparency. Electrical leads are spaced from the coated surface and are electrically insulated from the coating and bus bars.

20 Claims, 4 Drawing Sheets

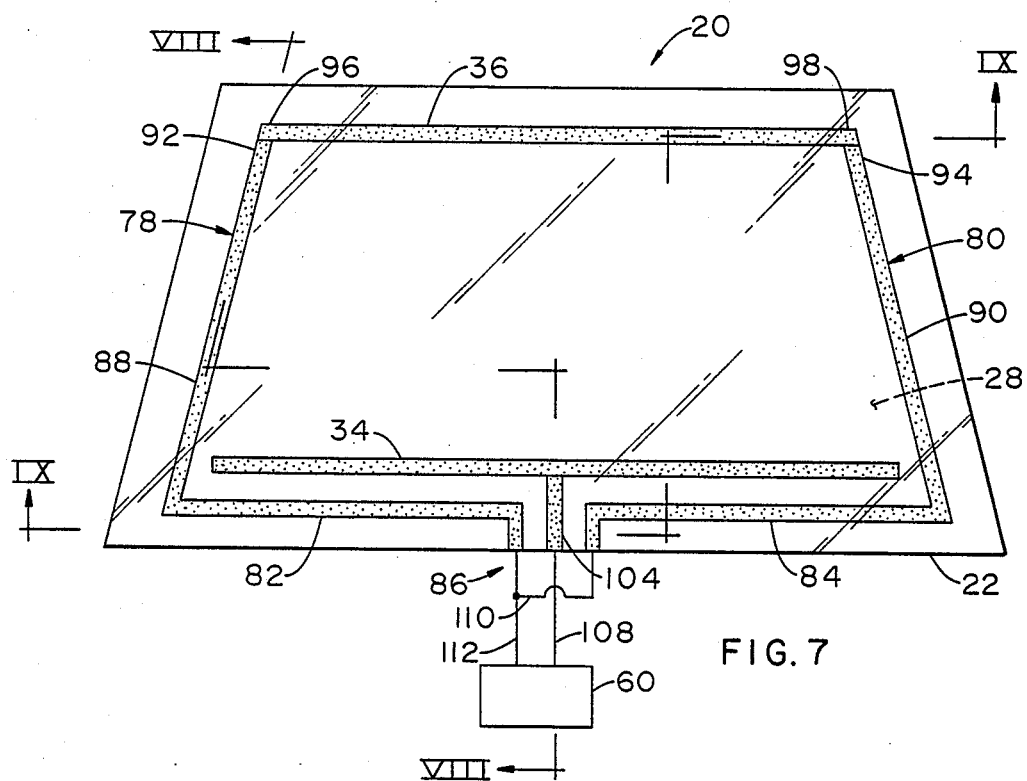
FIG. 7
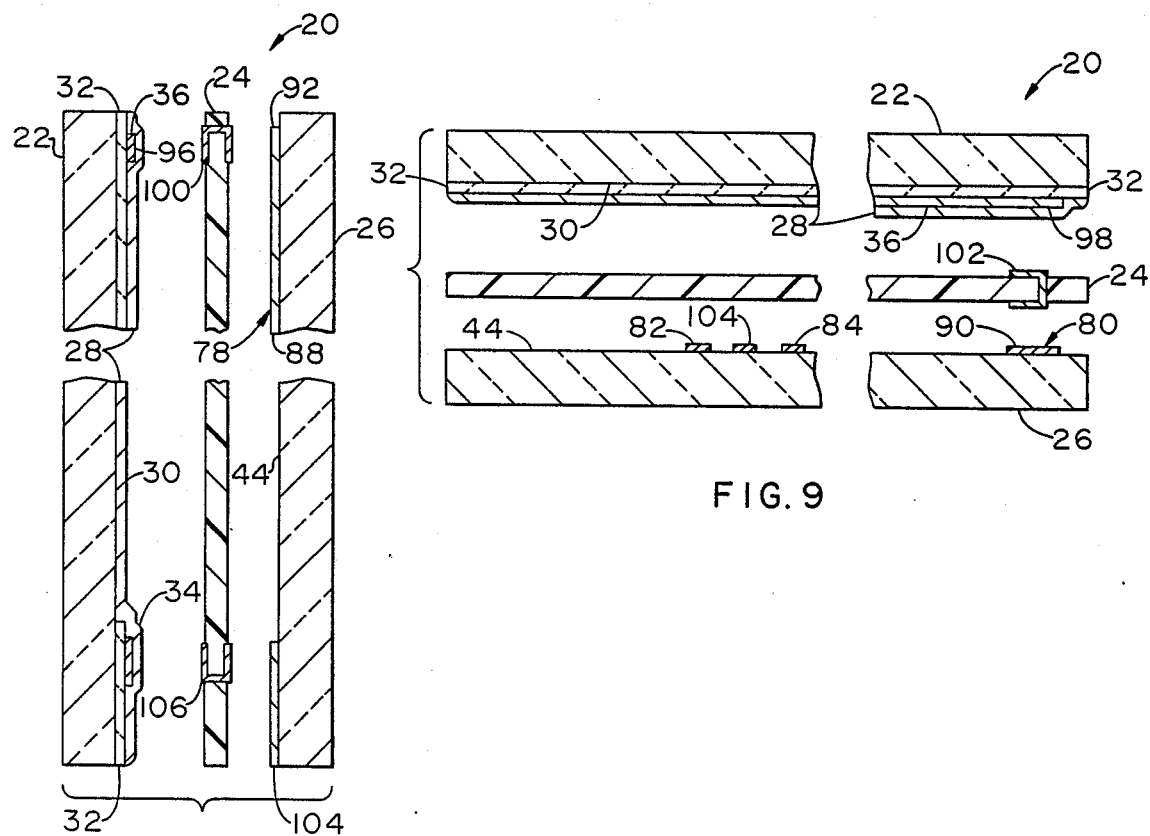
FIG. 9
FIG. 8

ELECTRICAL LEAD ARRANGEMENT FOR A HEATABLE TRANSPARENCY

BACKGROUND OF THE INVENTION

1. Field of the Invention

This invention relates to an improvement in an electrically heatable transparency, and in particular to an electrical lead arrangement to provide power to the bus bars of a heatable windshield.

2A. Technical Considerations

It has been known to pass electric current through a bus bar and transparent conductive coating to another bus bar on the surface of a transparency to raise its temperature. Generally, a source of electrical potential is connected to the coating by way of first and second bus bars each positioned along opposite sides of the transparency to be heated. The bus bars may be comprised of metallic foil strips but in the case of glass transparencies they preferably are comprised of a metallic-ceramic frit material fused onto a surface of the transparency. Electroconductive leads are positioned along the transparency surface to interconnect the bus bars to the electrical power source.

In fabricating these heatable transparencies, the bus bars leads must be electrically insulated from the electroconductive coating so as not to interfere with the desire flow of current from one bus bar through the coating to the opposite bus bar. This is generally accomplished by using a moveable protective covering such as a mask or tape on the surface of the transparency in the area of the lead prior to applying the coating. After coating, the covering is removed leaving an uncoated area for the bus bar leads. As an alternative, the entire surface can be coated and the coating subsequently deleted from the bus bar lead areas.

2B. Patents of Interest

U.S. Pat. No. 2,843,713 to Morgan teaches an electrically heated article with an electrically conductive coating on the surface of the article and a plurality of discontinuous bus bar sections along the edge of the coated surface to reduce the flow of current from the bus bar elements to adjacent portions of the coating.

U.S. Pat. Nos. 3,752,348 to Dickason et al.; 4,543,466, 4,668,270, and 4,743,741 to Ramus; 4,654,067 to Ramus et al.; 4,718,932 to Pharms; and 4,744,844 to Hurst teach a heatable windshield and methods for making same. The bus bars and electroconductive coating of the windshields are positioned on an interior surface within the windshield assembly. U.S. Pat. Nos. 4,543,466 and 4,744,844 disclose an electroconductive coating, bus bars, and lead members to the bus bars applied to the same surface of a glass sheet.

U.S. Pat. Nos. 4,078,107 and 4,128,448 to Bitterace et al. teach a window with a heating circuit and antistatic circuit and method for its preparation. The heating circuit of the window includes wire members embedded within a plastic ply.

U.S. Pat. No. 4,213,028 to Wolf teaches an electric heating device for vehicle windows including a pair of elongated electrically non-conductive carrier strips having an adhesive layer on both sides and secured in spaced apart relation to the glass surface by one of the adhesive layers. Foil strips with an adhesive layer extend between the carrier strips with their ends overlaying and adhered to the carrier strip. An electrical terminal overlays the carrier strip and ends of the foil strips to electrically interconnect the heating device members.

U.S. Pat. Nos. 4,323,946 to Truax and 4,590,535 to Mang teach static charge dissipation circuits including interconnected wire members extending through a plastic layer of the window.

SUMMARY OF THE INVENTION

The present invention provides a heatable transparent which includes first and second bus bars positioned along the opposing edges of a surface of the transparency, interconnected by an electroconductive coating. Leads are connected to each of the bus bars to electrically interconnect the bus bars with a power source. The leads are insulated from the coating and the bus bars by positioning a nonelectrically conductive substrate between the leads and the coating and bus bars. Electroconductive connecting members extend through the substrate to electrically interconnect the leads with the bus bars.

In one particular embodiment of the invention, the transparency includes first and second glass sheets laminated together with a plastic interlayer positioned therebetween. The bus bars and electroconductive coating are applied to the surface of the first glass sheet adjacent the plastic interlayer, and the leads are applied to the surface of the second glass sheet adjacent the plastic interlayer so that the interlayer electrically insulates the leads from the bus bars and coating. A metallic clip member extends through the interlayer to electrically interconnect the leads to the bus bars.

In another embodiment of the invention, the transparency includes at least a glass sheet laminated to a plastic sheet. The bus bars and electroconductive coating are applied to the surface of the glass sheet adjacent the plastic sheet, and the lead members are positioned on or within the plastic sheet such that at least a portion of the plastic sheet is interposed between the leads and the bus bars and coating so as to electrically insulate the leads therefrom. Electroconductive clip members extend at least partially through the plastic sheet to interconnect the leads with the bus bars.

BRIEF DESCRIPTION OF THE DRAWINGS

FIG. 7 is a schematic elevational view of a windshield incorporating another alternate embodiment of the present invention.

FIG. 8 is an exploded cross-sectional view through line VIII—VIII in FIG. 7.

FIG. 9 is an exploded cross-sectional view through line IX—IX of FIG. 7.

DETAILED DESCRIPTION OF THE INVENTION

The description of the invention is presented in combination with a laminated transparency comprised of two plies of glass bonded together by an interlayer of plastic which represents a typical windshield construction, but it should be understood that the invention can apply to heated transparencies involving a single ply of glass with a single ply of plastic, all plastic laminations and any other combinations involving numerous plies. The transparency need not be intended for use as an automobile windshield but may be any window for a vehicle or other enclosure, including aircraft.

Figure 1:
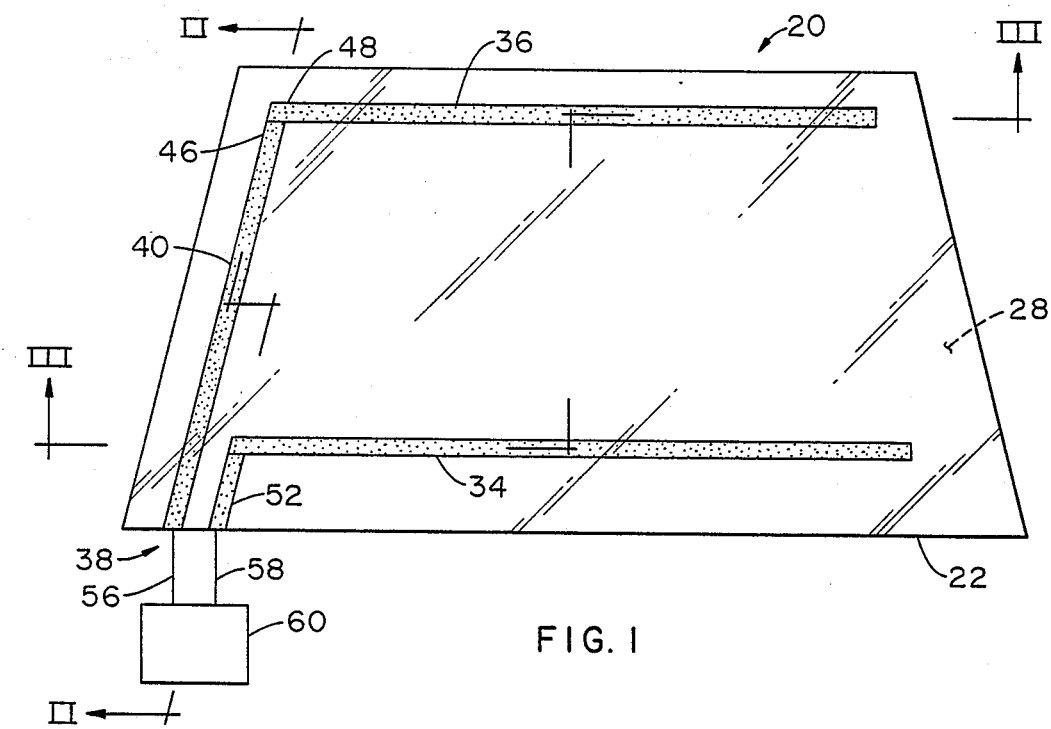
FIG. 1 is a schematic view of a windshield incorporating a bus bar and lead configuration of the present invention.
Figure 2:
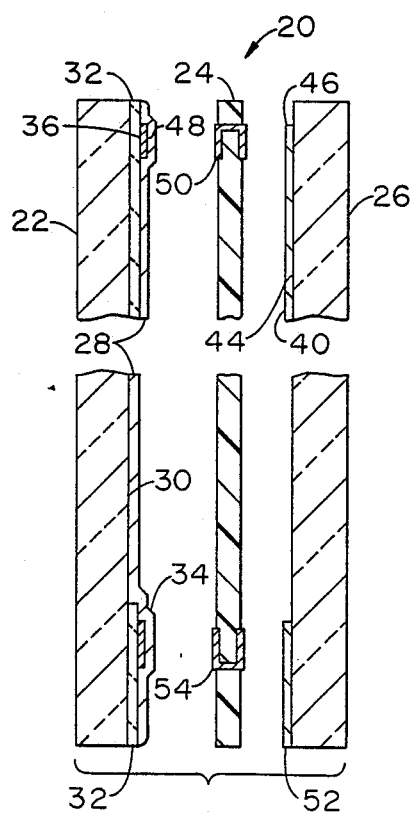
FIG. 2 is an exploded cross-sectional view through line II—II of FIG. 1.
Figure 3:
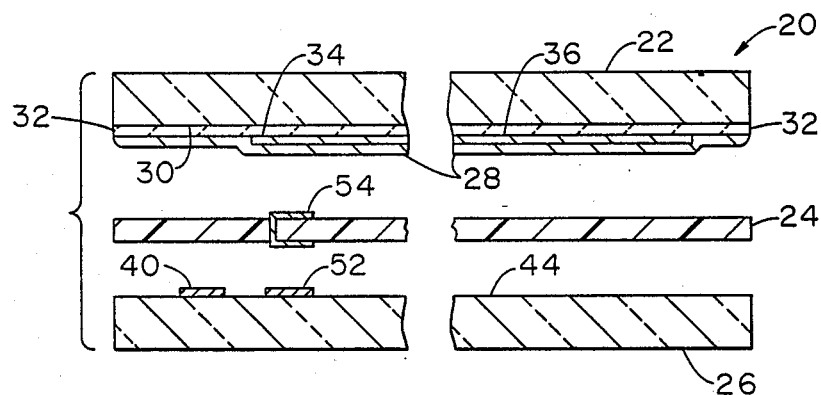
FIG. 3 is an exploded cross-sectional view through line III—III of FIG. 1.

FIGS. 1, 2, and 3 show a transparency 20 which includes an outboard glass sheet 22, a plastic interlayer 24 (shown only in FIGS. 2 and 3), which be polyvinylbutyral as its commonly used for laminated windshields or other suitable interlayer material, and an inboard sheet of glass 26 (shown only in FIGS. 2 and 3). An electroconductive coating 28 is preferably placed on a surface of the transparency 20 that is not exposed, most preferably on the inboard surface 30 of the outboard glass sheet 22. Various coatings may exhibit the combination of transparency and electroconductivity required to serve as the heating element for the transparency but a preferred coating is similar to that disclosed in U.S. Pat. No. 4,610,771 to Gillery, which teachings are hereby incorporated by reference. The coating comprises a silver film between a pair of zinc stannate films with a copper primer between the film layers, each of which may be applied sequentially by magnetron sputtering. The silver acts as the conductive layer and the zinc stannate films serve to mask the reflectance of the silver. The coating exhibits a resistivity of approximately 7 to 8 ohms when the silver layer has a thickness of about 110 angstroms. Although not limiting in the present invention, a portion of the coating 28 adjacent the edge of the glass sheet 22 can be removed in any convenient manner known in the art to improve adhesion of the glass sheet 22 to interlayer 24 about its periphery during lamination.

An optional opaque border 32 (shown only in FIGS. 2 and 3) serves to conceal the bus bars and other elements of the heating circuit. Although not limiting in the present invention, the opaque border 32 may be a ceramic enamel applied to the glass surface 30 in any convenient manner, i.e., by silk screening, and fired onto the surface 30 during the heating of the sheets for bending.

With continued reference to FIGS. 1, 2, and 3 a bottom bus bar 34 and top bus bar 36 are positioned on the surface 30 of the glass sheet 22 in contact with the coating 28. Electrical connections to the heatable windshield are preferably made along the lower edge at terminal area 38 (shown only in FIG. 1) although it should be understood that the connections could be made at any edge and at any location along an edge. Although not limiting in the present invention, the bus bars are preferably made of a ceramic frit material containing silver as is well known in the art, which may be applied to the surface 30 (or onto the opaque border 32) in any convenient manner, for example silk screening, and fused thereto by heating. The conductivity of the bus bars is chosen to be considerably greater than that of the coating 28 to prevent overheating of the bus bars and provide uniform current flow through the bus bars.

Electrical connection to the top bus bar 36 includes a lead 40 which is electrically insulated from the coating 28 and bottom bus bar 34. In the particular embodiment of the invention illustrated in FIGS. 1, 2, and 3, the lead 40 extends along a side edge of the transparency 20 to terminal area 38. Although not limiting in the present invention, the lead 40 is a silver containing ceramit frit material silk screened and fused onto surface 44 of inner glass sheet 26 so that interlayer 24 electrically insulates the lead 40 from the coating 28 and bus bars 34 and 36. End 46 of lead 40 is positioned to be generally overlaying but spaced from end 48 of top bus bar 36 by interlayer 24. A connector 50 extends through the interlayer 24 between ends 46 and 48 to electrically interconnect lead 40 with the top bus bar 36. Although not limiting in the present invention, connector 50 may be an embedded wire or a metal foil such as copper, aluminum, or brass that extends through the interlayer 24. As an alternative, the lead 40 can extend to the end of the glass sheet 26 and the connector 50 can wraps around the edge of the interlayer 24 and onto surface 30 of glass sheet 22.

Electrical connection to the bottom bus bar 34 may be made in a similar fashion. In particular, lead 52 may be a silver containing ceramic frit material, silk screened and fired onto surface 44 of the glass sheet 26 and electrically interconnected to the bottom bus bar 34 by a connector 54 extending through interlayer 24. Electrical leads 56 and 58, connect leads 40 and 52, respectively, to an electrical power source 60 to provide current to the transparency. A notch section (not shown) may be cut along the edge of outer glass sheet 22 at terminal area 38 to expose portions of leads 40 and 52 and better facilitate connection to leads 56 and 58, respectively. With this arrangement all the electrical connections to the bus bars are made on the surface 44 of the inner glass sheet 26.

Figure 4:
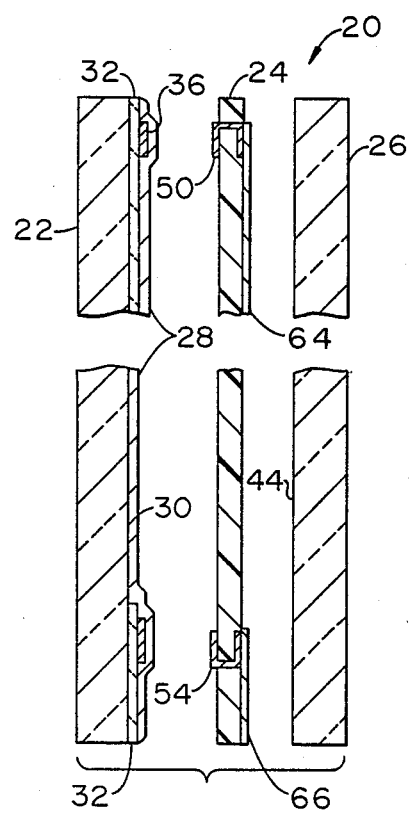
FIG. 4 is a view similar to that shown in FIG. 2 showing an alternate embodiment of the invention.
Figure 5:
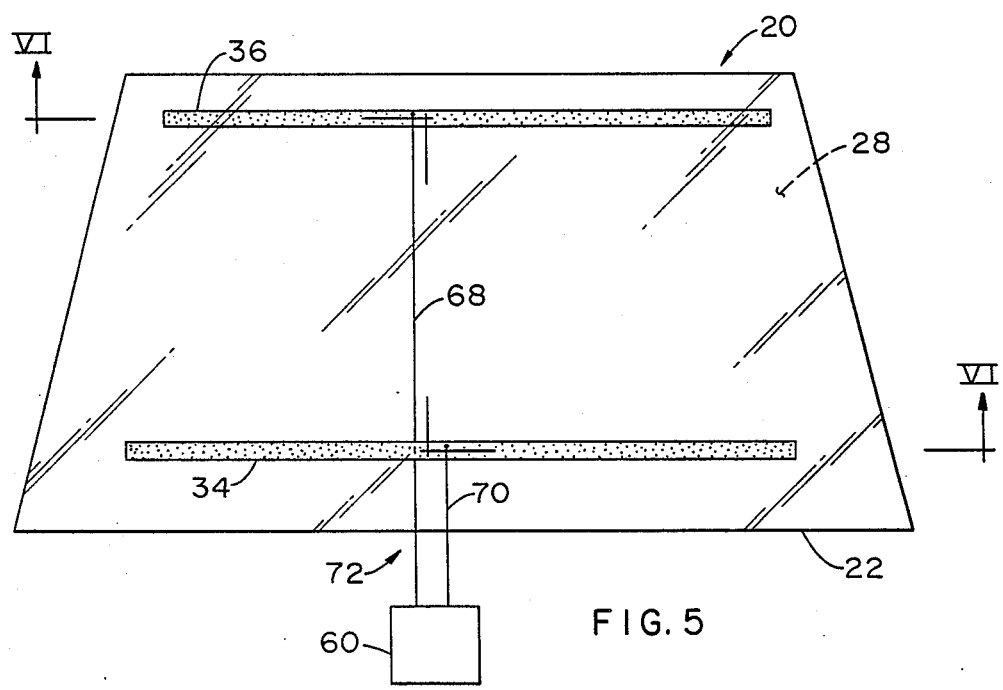
FIG. 5 is a schematic elevational view of a windshield incorporating an alternate embodiment of the present invention.
Figure 6:
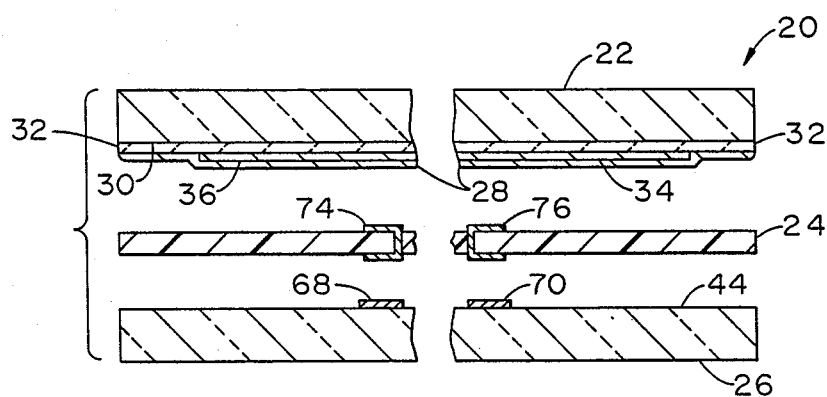
FIG. 6 is an exploded cross-sectional view through line VI—VI of FIG. 5.

From the previous discussion it would be obvious to one skilled in the art that other materials may be used for leads 40 and 52. For example, these leads may be a conductive foil (not shown) such as copper, brass, or aluminum, secured to surface 44 of glass sheet 26, or surface 62 of interlayer 24. The leads may also be wire members 64 and 66 which are secured to surface 44 of glass ply 26 (not shown) or on or within the interlayer 24 as shown in FIG. 4, in a manner similar to that taught in U.S. Pat. No. 4,078,107 to Bitterace et al., which teachings are hereby incorporated by reference, and connected to the bus bars with connectors as discussed earlier. Furthermore, since a wire lead would not noticeably block the vision area of the transparency 20, the lead wire to the bus bar 36 can be moved from the side edge of the transparency 20 to the center as shown in FIGS. 5 and 6. In particular, lead wires 68 and 70 extend from terminal area 72 to the top and bottom bus bars 36 and 34, respectively, where they are electrically interconnected to the respective bus bars by connectors 74 and 76.

The bus bar and lead arrangement taught in the present invention may also be used with a double electrical feed heatable transparency configuration as disclosed in U.S. Ser. No. 138,008 to Gillery, which teachings are hereby incorporated by reference. For clarity in the following discussion, elements that are the same as those discussed earlier will have the same numerical designation. Referring to FIGS. 7, 8, and 9, bottom bus bar 34 and top bus bar 36 are, for example, silver containing ceramic frit material applied to and fused onto surface 30 of the glass sheet 22 and are in contact with coating 28. The electrical connection to the top bus bar 36 includes leads 78 and 80 which are electrically insulated from the coating 28 and bottom bus bar 34. In the particular embodiment of the invention illustrated in FIGS. 7, 8, and 9, the leads 78 and 80 include conductive strips 82 and 84, respectively (shown only in FIG. 7) extending in opposite directions along the bottom edge of the transparency 20 from a terminal area 86 and side strips 88 (shown only in FIGS. 7 and 8) and 90 (shown only in FIGS. 7 and 9) extending along opposite side portions of the transparency 20 and connected to strips 82 and 84, respectively. End 92 of strip 88 and end 94 of strip 90 are positioned to be generally overlaying but spaced from opposing ends 96 and 98 of the top bus bar 36 by interlayer 24. Connectors 100 and 102 extend through the interlayer 24 between ends 92 and 96 and ends 94 and 98, respectively, to electrically interconnect leads 78 and 80 with the top bus bar 36.

Electrical connection to the bottom bus bar 34 may be made in a similar fashion. In particular, lead 104 may be a silver containing. frit ceramit frit material silk screened and fired onto surface 44 of the glass sheet 26, and electrically interconnected to the bottom bus bar 34 by a connector 106 extending through interlayer 24. Electrical lead 108 connects the bottom bus bar lead 104 to one pole of electrical power source 60, and leads 78 and 80 leading to the bus bar 36 may be wired in common to the opposite pole by means of jumper wire 110 and lead 112.

Figure 10:
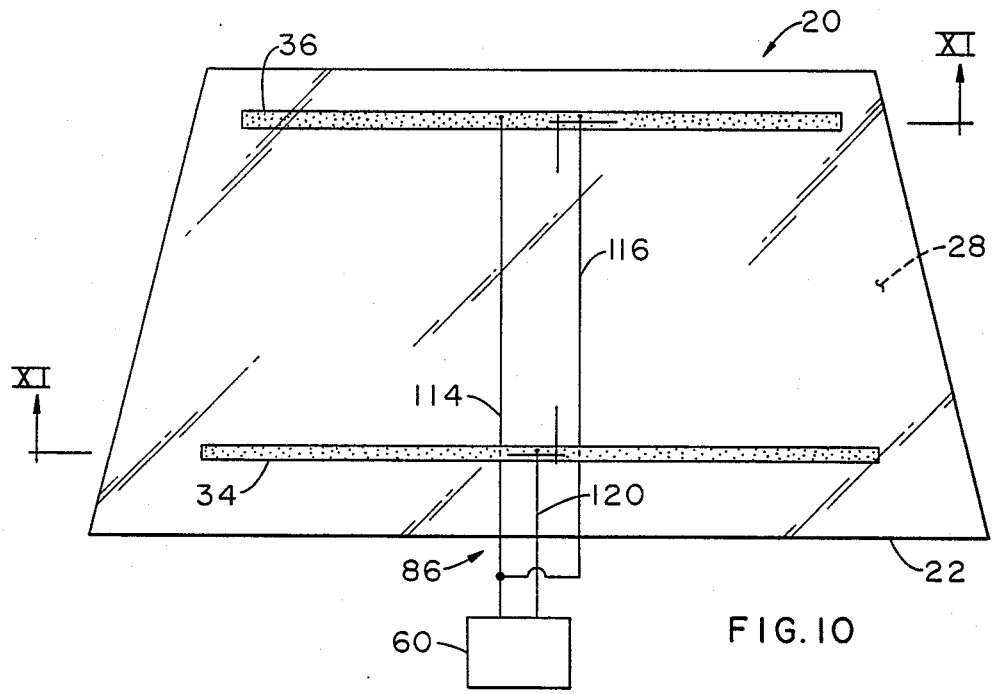
FIG. 10 is a schematic elevational view of a windshield incorporating another embodiment of the present invention.
Figure 11:
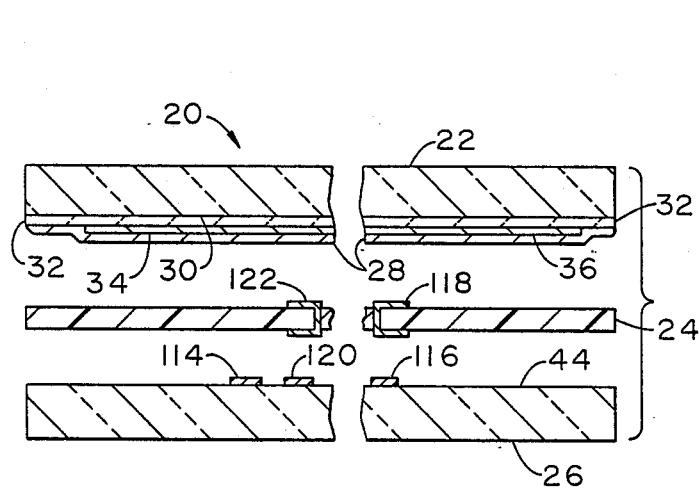
FIG. 11 is an exploded cross-sectional view through line XI—XI of FIG. 10.

It would be obvious to one skilled in the art that other materials such as wires or foils may be used for leads 78, 80, and 104, as discussed with respect to FIGS. 4, 5, and 6. Furthermore, for reasons discussed earlier with respect to FIG. 5, the wire leads to the top bus bar 36 can be moved from the side and lower edge of the transparency 20 to the center as shown in FIGS. 10 and 11. In particular, wire leads 114 and 116 extend from terminal area 86 to the top bus bar 36 where there are electrically interconnected to the top bus bar 36 by connectors 118 and lead 120 extends to bottom bus bar 32 and is electrically interconnected thereto by connector 122.

Figure 12:
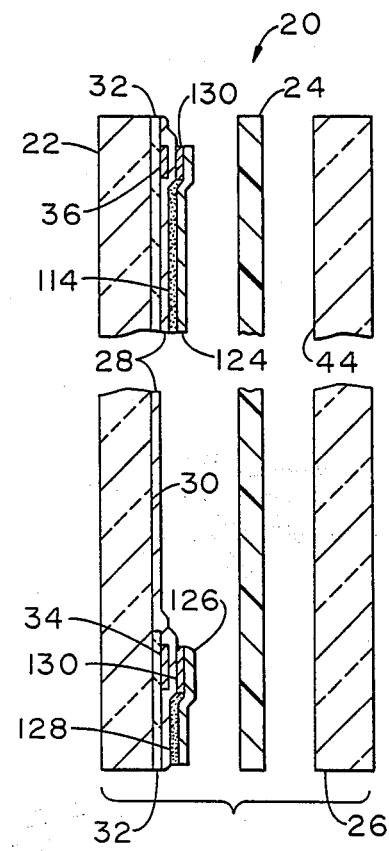
FIG. 12 is a view similar to that shown in FIG. 2-2 showing an additional embodiment of the present invention.

It would be obvious to one skilled in the art that other electroconductive materials other than those already discussed herein, may be used for the bus bar leads and that the leads can be positioned in any manner and at any location provided that they are electrically insulated from the coating 28. For example, the leads may be a sprayed metal (not shown) applied to the surface 44 of the glass sheet 26. Furthermore, referring to FIG. 12, leads 124 and 126 to bottom bus bar 34 and top bus bar 36, respectively, may be applied directly to the coating 28 using a nonconductive tape or glue 128 to electrically insulate the leads from the coating 28, allowing the ends of the leads 124 and 126 to electrically contact the coating 28 overlaying the respective bus bars. If desired, an electrically conductive adhesive 130 may be used to adhere the ends of the lead 124 and 126 to the coating 28 on bus bars.

The present invention may also be used in combination with a power sensor for a heatable transparency as disclosed in U.S. Ser. No. 267402 to Koontz filed 11-4-88, which teachings are hereby incorporated by reference. The sensor line (not shown) which can extend partially or entirely around the perimeter of the transparency can be spaced from the surface 30 of the glass sheet 22 to electrically insulate it from the coating and bus bars in a manner as discussed earlier.

The positioning of the electrical lead or leads to the top bus bar as taught in the present invention provides several advantages. Since the leads are spaced from the electroconductive coating and bus bars, no masking of the coated outer glass ply prior to coating or deletion of the coating after coating is required. The interlayer or nonconductive adhesives provide the necessary electrical insulation. In addition, the leads can be positioned anywhere it is convenient and are not restricted by the geometry of the bus bars. For example, the leads can extend along the side and lower edges of the transparency or up the center portion as discussed and may also overlay the bus bars. Furthermore, electrical connection can be made to the leads anywhere along the length of the bus bars.

The forms of the invention shown and described in this disclosure represent illustrative preferred embodiments thereof. It is understood that various changes may be made without departing from the teachings of the invention definedby the claimed subject matter which follows.

We claim:

1. An electrically heatable transparency comprising:
a nonelectrically conductive substrate;
a first bus bar on a surface of said substrate;
a second bus bar on said surface of said substrate spaced from said first bus bar;
an electroconductive heating member on said surface of said substrate interconnecting said first and second bus bars;
an electroconductive lead spaced from said surface of said substrate so as to electrically insulate said lead from said electroconductive member and said bus bars; and
means to electrically interconnect said lead with said first bus bar.

2. The transparency as in claim 1 wherein said heating member is in an electroconductive coating, said first bus bar is positioned along a first marginal edge of said substrate in contact with said coating, and said second bus bar is positionedalong a second opposing marginal edge of said substrate in contact with said coating to pass a current from one of said bus bars through said coating to the other of said bus bars.

3. The transparency as in claim 2 wherein said substrate comprises a lamination of at least one glass sheet and at least one plastic sheet with said coating and said bus bars on said surface of said glass sheet and between said glass sheet and said plastic sheet and further wherein at least a portion of said plastic sheet is positioned between said lead and said electroconductive coating and bus bars to electrically insulate said lead.

4. The transparency as in claim 3 wherein said electrically interconnecting means includes an electroconductive connector extending through at least a portion of said plastic ply to electrically interconnect said lead to said first bus bar.

5. The transparency as in claim 4 wherein said lead is a wire member positioned on or within said plastic layer.

6. The transparency as in claim 4 wherein said glass sheet is a first glass sheet and further including a second glass sheet laminated to said first glass sheet with said plastic layer positioned therebetween and further wherein said lead is an electroconductive member positioned along a surface of said second glass sheet in contact with said plastic sheet.

7. The transparency as in claim 6 wherein said electroconductive member is a silver containing ceramic frit material adhered to said surface of said second sheet.

8. The transparency as in claim 3 wherein said lead extends towards said second edge.

9. The transparency as in claim 8 wherein said second bus bar and said lead are provided with terminal portions closely adjacent to each other along said second edge.

10. The transparency as in claim 9 wherein said lead is a wire positioned on or within said plastic layer.

11. The transparency as in claim 10 wherein a portion of said lead extends along a thid edge of said transparency.

12. The transparency as in claim 11 wherein said lead is a first lead and further including a second lead spaced from said surface of said glass sheet and electrically insulated from said coating and bus bars and means to electrically interconnect said second lead with said second bus bar.

13. The transparency as in claim 12 further including a third lead spaced from said surface of said glass sheet so as to electrically insulate said third lead from said coating and bus bars, and means to electrically interconnect said third lead to said first bus bar.

14. The transparency as in claim 13 wherein a portion of said third lead extends along a fourth edge of said transparency.

15. The transparency as in claim 9 wherein said glass sheet is a first glass sheet and further including a second glass sheet laminated to said first glass sheet with said plastic layer positioned therebetween and further wherein said lead is an electroconductive member positioned along a surface of said second glass sheet in contact with said plastic sheet.

16. The transparency as in claim 15 wherein a portion of said lead extends along a third edge of said transparency.

17. The transparency as in claim 16 wherein said electroconductive member is a silver containing ceramic frit material adhered to said surface of said second sheet.

18. The transparency as in claim 17 wherein said lead is a first lead and further including a second lead spaced from said surface of said first glass sheet and insulated from said coating and bus bars, and means to electrically interconnect said second lead to said second bus bar.

19. The transparency as in claim 18 further including a third lead positioned along said surface of said second glass sheet and means to electrically interconnect said third lead to said first bus bar.

20. The transparency as in claim 19 wherein a portion of said third lead extends along a fourth edge of said transparency.

* * * * *

UNITED STATES PATENT AND TRADEMARK OFFICE
CERTIFICATE OF CORRECTION

PATENT NO. : 4,918,288

DATED : April 17, 1990

INVENTOR(S) : Thomas M. Carter and Harold S. Koontz

It is certified that error appears in the above-identified patent and that said Letters Patent is hereby corrected as shown below:

Column 6, line 42, claim 2, delete "in".

Column 6, line 45, claim 2, please insert a space between the words "positioned" and "along".

Column 6, line 63, claim 5, please delete "positined" and replace with --positioned--.

Column 7, line 16, claim 11, please delete "thid" and replace with --third--.

Column 8, line 8, claim 15, please insert a space between the words "lead" and "is".

Signed and Sealed this

Twenty-second Day of October, 1991

Attest:

HARRY F. MANBECK, JR.

*Attesting Officer*     Commissioner of Patents and Trademarks